F. W. BACON.
VULCANIZER.
APPLICATION FILED OCT. 3, 1911.

1,031,831.

Patented July 9, 1912.

Inventor,
Frank W. Bacon.

By David O. Barnell,
Attorney.

Witnesses:

UNITED STATES PATENT OFFICE.

FRANK W. BACON, OF OMAHA, NEBRASKA.

VULCANIZER.

1,031,831.

Specification of Letters Patent. Patented July 9, 1912.

Application filed October 3, 1911. Serial No. 652,654.

*To all whom it may concern:*

Be it known that I, FRANK W. BACON, a citizen of the United States, and a resident of Omaha, in the county of Douglas and State of Nebraska, have invented certain new and useful Improvements in Vulcanizers, of which the following is a specification.

My invention relates to vulcanizing apparatus, and it is the object thereof to provide a vulcanizer especially adapted for use in repairing inner tubes for pneumatic tires of motor vehicles.

My invention consists primarily in the combination with a motor vehicle having an internal combustion engine, of a vulcanizing device connected with the exhaust pipe of said engine so as to utilize the heat of the exhaust gases for vulcanizing patches on the tire tubes.

Other objects of my invention are to provide means for indicating and for regulating the temperature of the vulcanizer plate.

Constructions embodying my invention are illustrated in the accompanying drawings, in which—

Figure 1:
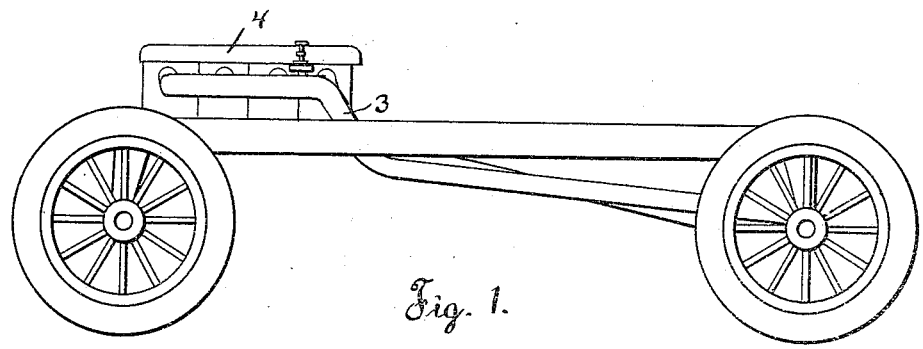
Figure 2:
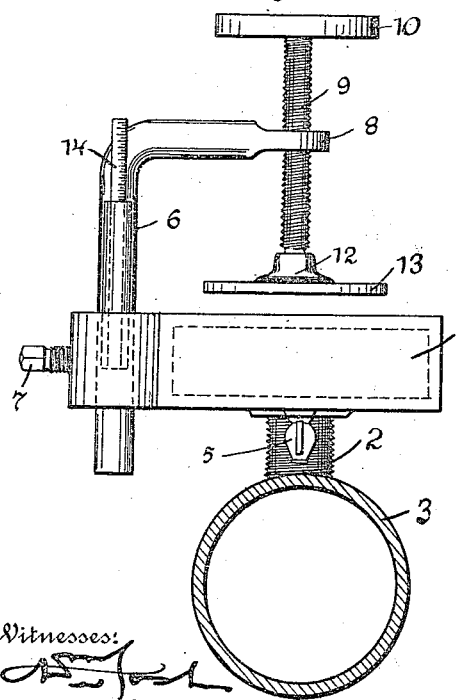
Figure 3:
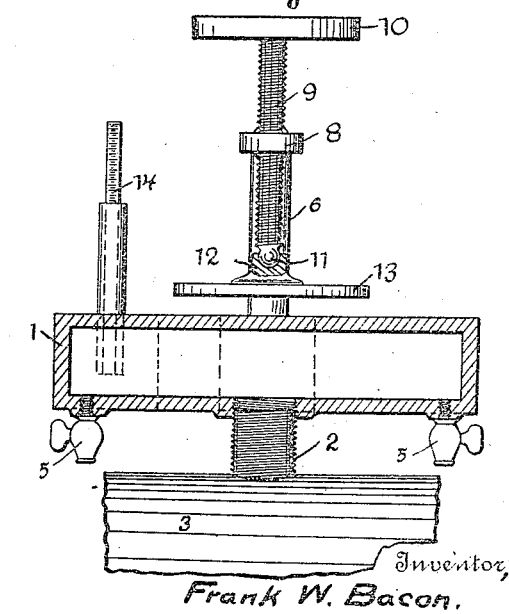

Figure 1 is a side view of the chassis of a motor vehicle having my vulcanizer applied to the engine thereof, Fig. 2 is an end view of the vulcanizer, and Fig. 3 is a longitudinal sectional view thereof.

In the illustrated embodiment of my invention I provide a hollow rectangular metallic plate 1, in the lower side of which at the center is a threaded opening in which is screwed a nipple 2. The other end of the nipple is screwed into a hole tapped in the side of the exhaust-pipe 3 of an internal combustion engine 4, the latter being shown in Fig. 1 as being carried by and forming part of a motor vehicle. Near the edges of the bottom of the plate 1 stop-cocks 5 are screwed therein, as shown.

At one side of the plate 1 is a projecting lug through which is a vertical opening. A rod 6 passes slidably through said opening and is adjustably held therein by means of a set screw 7. The upper portion of the rod is bent laterally over the top of the plate 1 and the end 8 thereof is flattened and has a vertical threaded opening in which is screwed the threaded stem 9. The said stem has at the upper end a hand-wheel 10 and at the lower end is a ball 11 which fits into a socket 12 on the top of the swivel-plate 13.

On the side of the plate 1, adjacent to the lug through which the rod 6 passes, is a second lug which has an opening made therein to receive the thermometer 14.

In the operation of the vulcanizer the stop-cocks 5 are opened more or less so that a portion of the exhaust gases from the pipe 3 will pass up through the plate 1 and heat the same. After a short time the temperature of the plate will be indicated by the thermometer 14 and if not as desired the temperature may be varied by varying the opening of the cocks 5 so as to permit a greater or less amount of the exhaust gases to pass through the hollow plate. I have found that the exhaust gases, taken in this way from the exhaust pipe of an ordinary internal combustion engine such as is used on motor vehicles, will heat the plate uniformly so that any vulcanizable article clamped on the top of the plate between the same and the swivel-plate 13 may be quickly and thoroughly vulcanized. I have also found that the temperatures are so uniform that after the cocks 5 are once regulated they need not be changed unless there should be an extreme variation of atmospheric temperature which would materially change the rate of radiation from the plate.

The convenience of having the vulcanizer carried directly upon a motor vehicle will be obvious. The device having once been regulated, it is always ready for immediate use whenever the vehicle is in use or its engine running. Tire repairs may thus be made at any time or place, it being merely necessary to clamp the tube and patch upon the plate 1, leave it in place for a suitable time, say twelve or fifteen minutes, and the repairing of the tube is completed.

Now, having described my invention, what I claim and desire to secure by Letters Patent is:

1. In a vulcanizing device, a hollow metal plate, means for connecting the same with the exhaust pipe of an internal combustion engine for supplying exhaust gases thereto, means for controlling the flow of gases through the plate, and means for holding vulcanizing articles on the plate.

2. The combination with an internal combustion engine, of a hollow plate, means connecting the same with the exhaust pipe of the engine, means for controlling the flow of exhaust gases through the plate, and means for indicating the temperature of the plate.

3. In a vulcanizing device, a relatively flat hollow metal plate, a pipe connected with the lower side thereof and extending to a source of heated gases under pressure, there being openings in the same side of the plate for permitting the escape therefrom of said heated gases, cocks controlling said openings, a rod adjustably connected with the plate and extending above the same, a threaded member sustained by the rod, and a swivel-plate carried by the threaded member and arranged to clamp articles against the upper side of the plate.

In testimony whereof I have hereunto subscribed my name in the presence of two witnesses.

FRANK W. BACON.

Witnesses:
D. O. BARNELL,
J. M. SHRAMEK.